United States Patent [19]

Malsot et al.

[11] 4,300,815
[45] Nov. 17, 1981

[54] CONNECTOR END FITTING FOR OPTICAL MONOFIBRE

[75] Inventors: Christian Malsot; Roland Desmurs; Jean Bouygues, all of Suresnes, France

[73] Assignee: Socapex, Suresnes, France

[21] Appl. No.: 88,457

[22] Filed: Oct. 25, 1979

[30] Foreign Application Priority Data

Oct. 27, 1978 [FR] France .................. 78 30606

[51] Int. Cl.³ .............................................. G02B 7/26
[52] U.S. Cl. ................................................. 350/96.20
[58] Field of Search ................ 350/96.20, 96.21, 96.22

[56] References Cited

U.S. PATENT DOCUMENTS

| 3,655,275 | 4/1972 | Seagreaves | 350/96.20 X |
|---|---|---|---|
| 3,734,594 | 5/1973 | Trambarulo | 350/96.21 |
| 3,758,189 | 9/1973 | Codrino | 350/96.20 |
| 4,019,241 | 4/1977 | Logan | 350/96.21 X |
| 4,057,322 | 11/1977 | Kao . | |
| 4,087,155 | 5/1978 | Deacon | 350/96.21 |
| 4,088,390 | 5/1978 | McCartney | 350/96.21 |
| 4,133,601 | 1/1979 | Le Guen et al. | 350/96.21 |
| 4,134,641 | 1/1979 | Kao et al. | 350/96.21 |
| 4,181,401 | 1/1980 | Jensen | 350/96.21 |
| 4,205,896 | 6/1980 | Borsuk | 350/96.20 |

FOREIGN PATENT DOCUMENTS

| 2363987 | 7/1975 | Fed. Rep. of Germany | 350/96.21 |
|---|---|---|---|
| 2821700 | 11/1978 | Fed. Rep. of Germany | 350/96.21 |
| 2842663 | 5/1979 | Fed. Rep. of Germany | 350/96.21 |
| 2331042 | 6/1977 | France . | |
| 52-25647 | 2/1977 | Japan . | |
| 1486681 | 9/1977 | United Kingdom | 350/96.20 |

OTHER PUBLICATIONS

Kolodzey et al., "Optical Connector Measurement System", *IBM Tech. Discl. Bull.*, vol. 22, No. 1, June 1979, pp. 47-48.

*Primary Examiner*—John D. Lee
*Attorney, Agent, or Firm*—Cushman, Darby & Cushman

[57] ABSTRACT

The invention relates to the field of connectors for optical monofibres.

In the case where the monofibre (1) is covered by a flexible sheath or envelope (3), the fixing in a connector end fitting may suffer from poor concentricity. According to the invention, a deformable cylinder (4) is placed round the fibre and to said cylinder are applied forces (P) balanced in four perpendicular directions transmitted to the flexible sheath (3) of the fibre by four, internal clamping jaws (31), which bring about a spontaneous recentering of the fibre by the creep or flow thereof. The cylinder is then placed in the end fitting.

The applications relate more particularly to optical fibres with plastic sheaths for telecommunications purposes.

4 Claims, 5 Drawing Figures

FIG_1
FIG_1-a
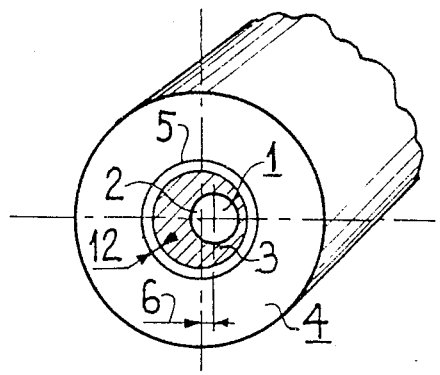
FIG_1-b
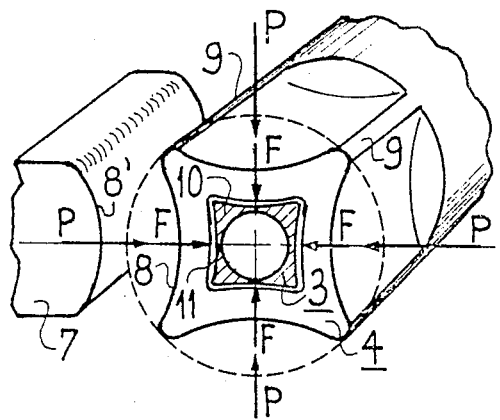
FIG_1-c
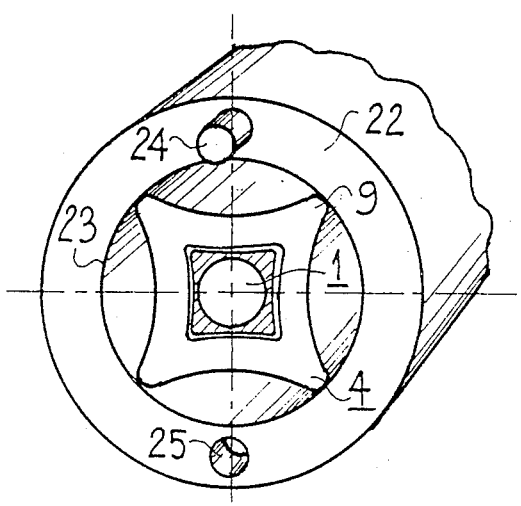

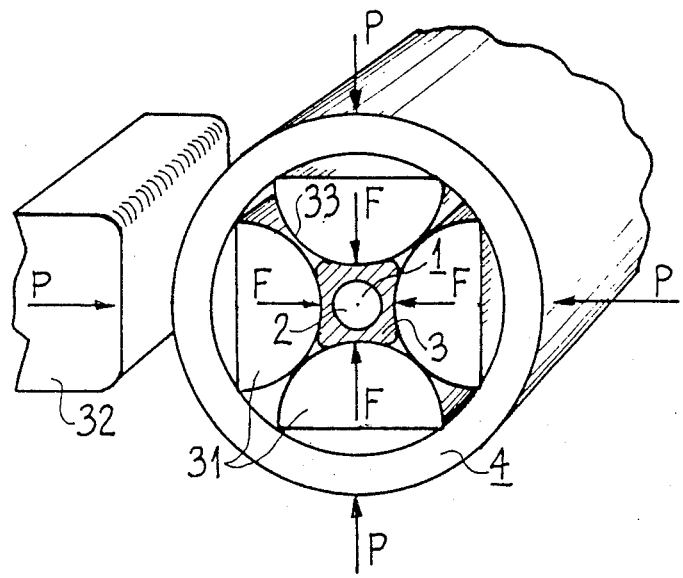
FIG_2
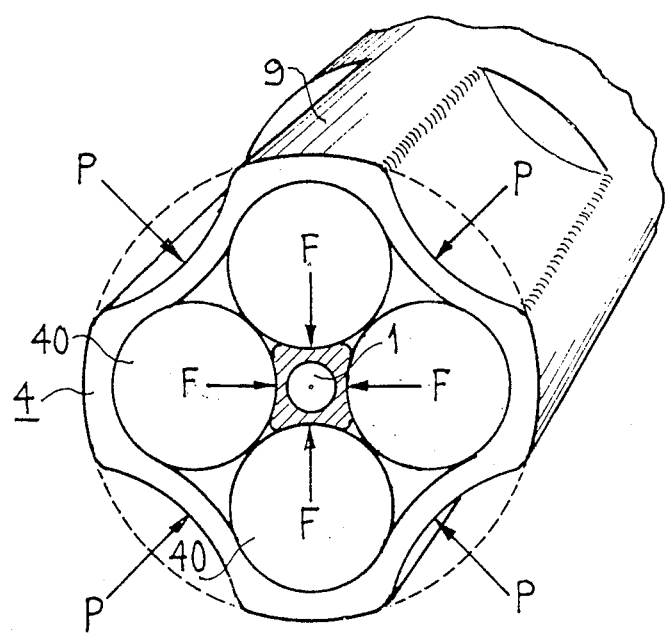
FIG_3

CONNECTOR END FITTING FOR OPTICAL MONOFIBRE

BACKGROUND OF THE INVENTION

The present invention relates to the field of connectors for optical lines of the monofibre type.

Connectors of this type generally have two end fittings, each of which contains one of the ends of one of the fibres to be connected. The optical connection between the contact faces of the two monofibres requires, due to the very small dimensions of their cross-sections, surfaces limited by circles having diameters of approximately 100 microns and a high degree of precision in the transverse positioning of the ends of the two fibres in their respective end fitting.

This condition is generally fulfilled by adopting as the reference transverse positioning surface that of the actual fibre, which is satisfactory from the standpoint of the constituent material which is a very hard glass or silica and from the standpoint of its precise geometrical shape which is that of a cylinder with a circular base. However, certain types of optical fibres have recently been developed which have a core of silica of glass and a coaxial plastic sheath. The plastic sheath has no particular mechanical protective function and participates in the optical guidance of the light injected into the core. These fibres have the following main advantages:

- relatively low losses per kilometer below 10 dB;
- a high tensile strength exceeding 1 kg;
- the capacity to support very small radii of curvature down to 10 mm;
- sufficiently large diameters to permit easy manipulation, the core diameters being between 150 microns and 1 millimeter.

However, difficulties are encountered when interconnecting these fibres. Thus, it is necessary for the terminal faces of the two fibres to be connected to precisely face one another and more specifically this applies to the actual cores and although this condition is known, it makes it necessary to have a lateral reference surface which is both precise and non-deformable. However, as a result of its manufacturing method, the precision of the plastic sheath is not sufficient to be considered as having a precisely defined diameter and in addition it does not constitute a non-deformable surface because it is made from a malleable surface. Finally, there is generally no centering of the core in the sheath and this leads to offcentering which can then reach several dozen microns.

Thus, the only reference surface which can be used is the lateral cylindrical surface of the core, which has great hardness, an excellent dimensional regularity and whose cross-section is a perfect circle. In order to use this reference surface, it would be possible to move the plastic sheath in order to bring about a direct centering about the fibre core. However, the optical phenomenon of reflection at the interface between the core and the sheath cannot then occur and losses appear which compromise the good continuity of optical transmission.

BRIEF SUMMARY OF THE INVENTION

The present invention proposes the perfect centering of the core of an optical fibre relative to a reference surface constituted by an internal channel made in a metal cylinder, while retaining the existence of the optical sheath around said core over its entire length.

In order to obtain this result, the invention calls on a surprising phenomenon and which does not devolve in an obvious manner from the prior art, namely a plurality of balanced radial forces are applied to the lateral surface of the plastic sheath, which brings about a spontaneous regularisation of the thickness thereof in the regions where said forces are applied due to the creep or flow of the material from which it is made, leading to a spontaneous recentering of the fibre core relative to the external reference cylinder.

According to an advantageous feature of the invention, these forces are applied to the optical plastic sheath after placing the fibre in the channel with a reference jacket and according to a first embodiment of the process of the invention the balanced radial forces are created by deformation of the cylindrical walls thereof under the influence of external forces.

Thus, the invention relates to a process ensuring the balanced application to the plastic sheath of the radial forces necessary for flow or creep, whereby said process comprises when used under practical conditions the use of locking or clamping devices such as prior art multiple jaw clamps.

These clamping devices can be considered as having two main means, namely on the one hand a first means which receives the external locking forces, such as a system of articulated levers and which transmits them to a second means, conventionally known under the name "jaws" which applies said forces to the object to be clamped.

According to a preferred embodiment of the process of the invention, said two means are divided by placing the jaws directly within the axial channel of the reference cylinder, while only leaving on the outside the first means ensuring the transmission of the clamping or locking forces by deformation of the cylinder wall.

This division leads to important advantages of high precision in the obtension of the centering phenomenon by creep or flow to the possibility which it provides of selecting geometrically very precise internal jaws, while permitting a less stringent choice with regard to the external clamping devices, which can be made and used with reduced precision.

The optimum number of radial forces necessary for obtaining a satisfactory centering flow is dependent on parameters linked with the nature of the material from which the plastic sheath is made and also the thickness thereof. Tests carried out by the Applicant have shown that in the case of fibres with the dimensions indicated hereinbefore, four was the optimum number. In particular, in the case where the four internal jaws are realised according to cylindrical rods and in cross-section are consequently delineated by four circles which are substantially tangential to one another and which define a central cavity for the optical fibre the choice of four jaws proves to be very advantageous by alluding to diameters of a convenient scale, namely much larger than in the case of six jaws and much smaller than in the case of three jaws, corresponding to respectively too small and too large reference cylinders.

More specifically, the invention relates to a process for fixing an end fitting of a connector to an optical monofibre having a plastic optical sheath, said end fitting being constituted by a cylindrical tube, wherein it comprises the introduction of the end of the monofibre into a cylindrical jacket having an internal channel with a circular cross-section, the application of radial external forces of the same magnitude in four regions of the jacket, oriented by 90° relative to one another, ensuring by deformation of the inner channel the application of forces to the monofibre which produce the flow or creep of its optical sheath and the fixing of the jacket containing the monofibre in the end fitting of the connector.

The invention also relates to an end fitting permitting the performance of the process according to the invention where the cylindrical jacket has supplementary means for the precise application of creep forces to the plastic sheath of the monofibre.

BRIEF DESCRIPTION OF THE DRAWINGS

The invention will be better understood from the following description, with reference to the attached drawings, wherein show:

FIG. 1 in three stages (a), (b), (c) a first embodiment of the process of the invention.

FIG. 2 a second embodiment having internal locking or clamping jaws.

FIG. 3 a variant of the second embodiment with cylindrical clamping or locking jaws.

DETAILED DESCRIPTION OF THE PREFERRED EMBODIMENTS

By means of sectional views of the three stages (a), (b) (c), FIG. 1 represents the performance of the process of producing a connector end fitting for an optical fibre according to the invention.

The first stage (a) involves the introduction of the optical fibre 1, constituted by a core 2 and a plastic sheath 3, into a cylindrical jacket 4 perforated by an axial channel 5. The jacket is made from a material which is able to undergo a permanent deformation under the action of a force applied thereto, such as copper, lead or even certain per se known plastics materials. The choice of the internal diameter of the channel leaves a given clearance 12. The thickness of its wall is limited to a value compatable with the possibility of deformation under the action of a given force.

In the most frequent case, the optical fibre 1 has an irregularity in the thickness of its optical sheath 3 and the axis of its cylindrical core 2 is therefore off-centered relative to the axis of the internal cylindrical channel 5 of the jacket by a length 6.

Part (b) of FIG. 1 shows the second stage of the process of the invention. In this stage, jacket 4 is subject to the action of four radially oriented forces F which are exerted on it by jaws such as 7, whereof only one is shown for simplification purposes, carried by a per se known clamp with four jaws such as are used for fixing contact "lugs" to electric wires. These jaws have a lateral locking surface 8' in the form of a cylinder whose generating lines are oriented parallel to those of jacket 4 in this stage. Under this action the external surface of the jacket is crushed in accordance with four depressions such as 8 oriented at 90° and between which there are unmodified regions such as 9, representing the original diameter of the jacket. If the four forces F are substantially equal and opposed, they balance one another out in pairs and the four depressions made are substantially of the same depth. The creation of four convex regions in the inner channel of the jacket corresponds to that of the creation of the said depressions and produces the application of radial forces to the plastic sheath.

It is in this stage and under the above indicated influence that there is creep of the optical plastic sheath 3 which migrates into the cavities such as 10 left by the crushing of the jacket in its central channel, as a result of the clearance, leading to a spontaneous centering of the fibre in its sheath. At the end of the stage, each of the four regions 11 facing a depression 8 have a substantially identical thickness, to within 2.5 microns. Thus, all the dimensions of the jacket, viewed in cross-section, have a quaternary symmetry.

FIG. 1c represents the third and final stage of the construction of the end fitting, consisting of the introduction of jacket 4 into a hollow cylinder 22, the diameter of the inner cylindrical wall 25 being substantially of the same order of magnitude as regions 9 of the centering jacket 4.

There is therefore a precise centering of fibre 1 relative to end fitting 22, which can be very accurately made to face another end fitting by using a centering device such as a stud 24 and a recess 25 ensuring an optical transmission with very limited losses.

FIG. 2 shows the realisation of a variant of the end fitting construction process according to the invention, which is particularly advantageous in the case of smaller diameter fibres. According to this variant, the device ensuring the creation of creep or flux forces of the optical plastic sheath is divided into two separate means, namely on the one hand the four jaws such as 31 located inside the centering jacket 4 and on the other the means for appiying the necessary forces to the jaws, such as push button or rod 32 fixed to not shown levers. The advantage of this variant is that the plastic sheath is no longer in contact with a wall of a jacket whose curvature may be irregular after deformation, but is in direct contact with the jaws 31, whose surface can be made with a very great precision and is formed from a very hard material such as steel.

The outer surface of jacket 4, after the action of push buttons or rods 32 has unmodified regions which, as in stage (c) of FIG. 1, can be used as reference surfaces for the final fixing in an end fitting by any per se known means such as welding, adhesion or locking by screws.

Each inner jaw has a face with a given radius of curvature for ensuring the creep phenomenon and a planar face for receiving the force applied by the corresponding push button or rod. Advantageously, when viewed in section, a jaw has a semicircular shape.

FIG. 3 shows another embodiment of the process for making an end fitting for an optical fibre according to the invention, which constitutes a variant of the process illustrated in FIG. 2.

According to this variant, which is of particular interest for very small diameter optical fibres, the four jaws are in the form of complete cylinders 40 having a circular cross-section, which can be made with very great precision and with a very great surface hardness, for example from steel.

The succession of stages is identical to that of FIG. 2. However, the application of external push rods or buttons 32 to jacket 4 can advantageously be effected in directions P which are perpendicular to one another, but are oriented by 45° relative to that of the desired creep forces F, which brings about a particularly effective balancing action between said four forces by the thus formed vertical composition.

This is a particularly useful effect because, as is known in geometry, the film of equilibrium represented by four circles which are tangential to one another permits an infinity of lozenge shapes, unlike with three and six tangential circles which constitutes a stable form and which falls entirely outside the scope of the present invention.

However, it is pointed out that as has been shown by the experience of the Applicant and as has been stated hereinbefore the result of performing the process according to the invention, namely the spontaneous centering of the optical fibre in its plastic sheath by flow or creep is largely dependent, for given forces applied, on the thickness of the latter and on the material from which it is made. Thus, in the embodiment of FIG. 3, tangential contact between the four cylindrical jaws only constitutes a special case and it is the determination by practical tests of the limits between which the values of the forces applied must be included which ensures the optimum creep conditions which are characteristic of the invention.

Although the process of the invention has been described in connection with the embodiment of FIG. 3 with reference to cylindrical jaws having a circular base, it is possible to use any jaw shape which is able to provide an equivalent creep function without passing beyond the scope of the invention. In particular, the substitution of four cylindrical balls for the four cylinders described forms part of the invention.

Finally, it is pointed out that the spontaneous centering phenomenon as a result of plastic creep can be used, when suitable plastic materials are employed, in the centering of an optical fibre by the creep of its envelope protecting it against the environment. It is then necessary for the fibres to be of the silica sheath type, permitting the use of the outer sheat surface as the reference centering surface.

In a practical case given in exemplified manner, a diameter 420 micron optical fibre having a 200 micron silica core and a 110 micron thick optical plastic sheath has been centered by spontaneous centering, to with 2.5 microns, in a jacket with four jaws having a circular cross-section and a diameter of 0.5 mm.

What is claimed is:

1. A connector end fitting for an optical fiber having a plastic sheath comprising:
    a permanently deformable centering jacket;
    an axial channel defined within said centering jacket;
    at least four (4) jaws within said axial channel, said jaws defining thereamong an axial passage within said axial channel for receiving the plastic sheathed optical fiber, said jaws being positioned such that they will be in tangential contact with one another after an application of radial forces to the outer surface of the jacket at points corresponding to the jaws, the radial forces (a) causing depressions in the jacket and leaving portions thereof with its original diameter, and (b) forcing the jaws toward one another so as to restrict the axial passage defined by them to a diameter that is less than the diameter of the plastic sheath, but greater than the diameter of the optical fiber, the restriction of the passage causing a spontaneous centering of the optical fiber within its sheath and within the centering jacket.

2. A connector end fitting as claimed in claim 1, wherein the jacket is in the form of a cylinder, the jaws being cylinders with a circular base disposed parallel to the axis of symmetry of the cylindrical jacket.

3. A connector end fitting as claimed in claim 1, wherein the jaws are shaped as spherical balls.

4. A connector end fitting according to claim 1, wherein the sheath is an optical sheath.

* * * * *